US009301504B2

(12) United States Patent
Wurth et al.

(10) Patent No.: US 9,301,504 B2
(45) Date of Patent: Apr. 5, 2016

(54) ANIMAL PLAY TOY

(71) Applicant: NESTEC SA, Vevey (CH)

(72) Inventors: Stephen Andrew Wurth, St. Louis, MO (US); Kisun Kim, St. Louis, MO (US); Jacob Ballard, Wheat Ridge, CO (US); Paul Seal, University City, MO (US); James P Persells, Hickory, NC (US); Janice Halbirt, St. Joseph, MO (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/370,167

(22) PCT Filed: Jan. 3, 2013

(86) PCT No.: PCT/US2013/020041
§ 371 (c)(1),
(2) Date: Jul. 1, 2014

(87) PCT Pub. No.: WO2013/103650
PCT Pub. Date: Jul. 11, 2013

(65) Prior Publication Data
US 2014/0367284 A1    Dec. 18, 2014

Related U.S. Application Data

(60) Provisional application No. 61/582,968, filed on Jan. 4, 2012.

(51) Int. Cl.
*A01K 15/00* (2006.01)
*A01K 11/00* (2006.01)
*A01K 15/02* (2006.01)
*B65D 85/00* (2006.01)

(52) U.S. Cl.
CPC ............. *A01K 15/026* (2013.01); *A01K 15/025* (2013.01); *B65D 85/00* (2013.01)

(58) Field of Classification Search
CPC . A01K 15/025; A01K 15/026; A01K 5/0114; A01K 15/024; A01K 5/0135
USPC .......................... 119/709, 702, 707, 710, 711
See application file for complete search history.

(56) References Cited

U.S. PATENT DOCUMENTS

| 2,554,516 | A | * | 5/1951 | Anthony | 446/325 |
| 2,601,767 | A | * | 7/1952 | Wall | 220/719 |
| 2,806,643 | A | | 9/1957 | Weiss | |
| 2,937,872 | A | * | 5/1960 | Gilman | 473/444 |
| 3,830,202 | A | * | 8/1974 | Garrison | 119/709 |
| D256,705 | S | * | 9/1980 | Nakao et al. | D21/604 |

(Continued)

OTHER PUBLICATIONS

Wobbler webpage [online] Kong Company 2011.
(Continued)

*Primary Examiner* — Yvonne Abbott-Lewis
(74) *Attorney, Agent, or Firm* — Ronald A. Burchett; Julie M. Lappin

(57) ABSTRACT

The invention provides animal play toys that engage an animal in play before and during consumption of a treat. In one aspect, the invention provides an animal play toy having a top portion defining at least one hole therethrough and a weighted bottom portion. The animal play toy is able to stand upright when there is no interaction with the animal play toy. One or more ropes of a consumable product or a non-consumable product can be attached to the top portion of the animal play toy through the hole.

13 Claims, 3 Drawing Sheets

(56) References Cited

U.S. PATENT DOCUMENTS

| | | | | |
|---|---|---|---|---|
| 4,321,888 | A | * | 3/1982 | Topliffe .................... 119/709 |
| 5,074,249 | A | * | 12/1991 | McMahon .................... 119/709 |
| 5,092,272 | A | * | 3/1992 | O'Rourke .................... 119/709 |
| D329,475 | S | * | 9/1992 | Revell .................... D21/551 |
| D334,139 | S | * | 3/1993 | Gozzini .................... D9/608 |
| 5,367,986 | A | * | 11/1994 | O'Rourke et al. ............ 119/709 |
| D380,879 | S | | 7/1997 | Hernandez |
| 6,050,224 | A | * | 4/2000 | Owens .................... 119/710 |
| 6,112,698 | A | * | 9/2000 | Zelinger .................... 119/61.54 |
| 6,167,841 | B1 | * | 1/2001 | Ho .................... 119/61.54 |
| 6,672,253 | B1 | * | 1/2004 | Viola .................... 119/709 |
| 7,367,283 | B2 | * | 5/2008 | Aboujaoude et al. ......... 119/707 |
| 7,905,491 | B2 | * | 3/2011 | Gray .................... 273/450 |
| 8,033,253 | B2 | * | 10/2011 | Ritchey et al. ............... 119/707 |
| D661,849 | S | * | 6/2012 | Soto .................... D30/160 |
| 8,225,747 | B2 | * | 7/2012 | Markham et al. .......... 119/51.01 |
| 8,393,300 | B2 | * | 3/2013 | Markham et al. ............. 119/709 |
| 8,505,239 | B2 | * | 8/2013 | Tompkins, IV ................ 47/65.5 |
| D705,075 | S | * | 5/2014 | Zwettler et al. ................ D9/601 |
| D726,975 | S | * | 4/2015 | Kim et al. .................... D30/160 |
| 9,004,011 | B2 | * | 4/2015 | Foley .................... 119/709 |
| 2005/0123585 | A1 | | 6/2005 | Cox et al. |
| 2011/0083608 | A1 | | 4/2011 | Markham et al. |
| 2011/0139815 | A1 | * | 6/2011 | Benson .................... 222/1 |
| 2011/0162998 | A1 | | 7/2011 | Wurth et al. |
| 2013/0047931 | A1 | * | 2/2013 | Lai .................... 119/710 |

OTHER PUBLICATIONS

International Search Report & Written Opinion, PCT/US2013020041 dated Feb. 21, 2013.

* cited by examiner

ANIMAL PLAY TOY

BACKGROUND OF THE INVENTION

1. Field of the Invention

The invention relates generally to animal play toys and particularly to animal play toys having a consumable rope that engages an animal in play before and during consumption of the consumable rope.

2. Description of Related Art

Animal chew toys are designed to entertain the animal, combat animal boredom, prevent destructive animal chewing behavior, and provide an outlet for an animal's innate chewing instinct. Generally, animal chew toys are made from plastic or other material that cannot be eaten by the animal. Animals typically tire of non-edible animal chew toys after a short period of time and move on to other activities. At the same time, non-edible animal chew toys provide no nutritional value to the animal and are limited to providing a health benefit to the animal.

In addition, there are currently few animal play products that help or aide in facilitating playtime between animals and their owners during treat time. Moreover, animal treats are typically tossed on the ground or fed by hand and are consumed quickly with little to no interaction. This can lead to the animal consuming a larger number of animal treats over a period of time, which can adversely impact the animal's health.

There is, therefore, a need for a new animal play toy that engages an animal in play before and during consumption while also providing nutritional value to the animal.

SUMMARY OF THE INVENTION

It is, therefore, an object of the present invention to provide an animal play toy that engages an animal in play before and during consumption of an animal treat.

It is a further object of the invention to provide an animal play toy having an edible component incorporated as part of the animal play toy.

It is yet another object of the present invention to promote the health or wellness of an animal using an animal play toy.

It is a further object of the invention to provide containers and packages including one or more animal play toys that engages an animal in play before and during consumption.

One or more of these or other objects are achieved by providing an animal play toy having a top portion defining at least one hole therethrough and a weighted bottom portion. The animal play toy is able to stand upright when there is no interaction with the animal play toy. One or more ropes of a consumable product or a non-consumable product can be attached to the top portion of the animal play toy through the hole. The animal play toy creates a fun experience for both an owner and a pet animal by providing a custom designed device that enhances the playtime moments while allowing the pet work to get the snack/treat out of the animal play toy and makes it more challenging and slows down the intake of the snack/treat during eating.

Other and further objects, features, and advantages of the present invention will be readily apparent to those skilled in the art.

DETAILED DESCRIPTION OF THE INVENTION

Definitions

Figure 1:
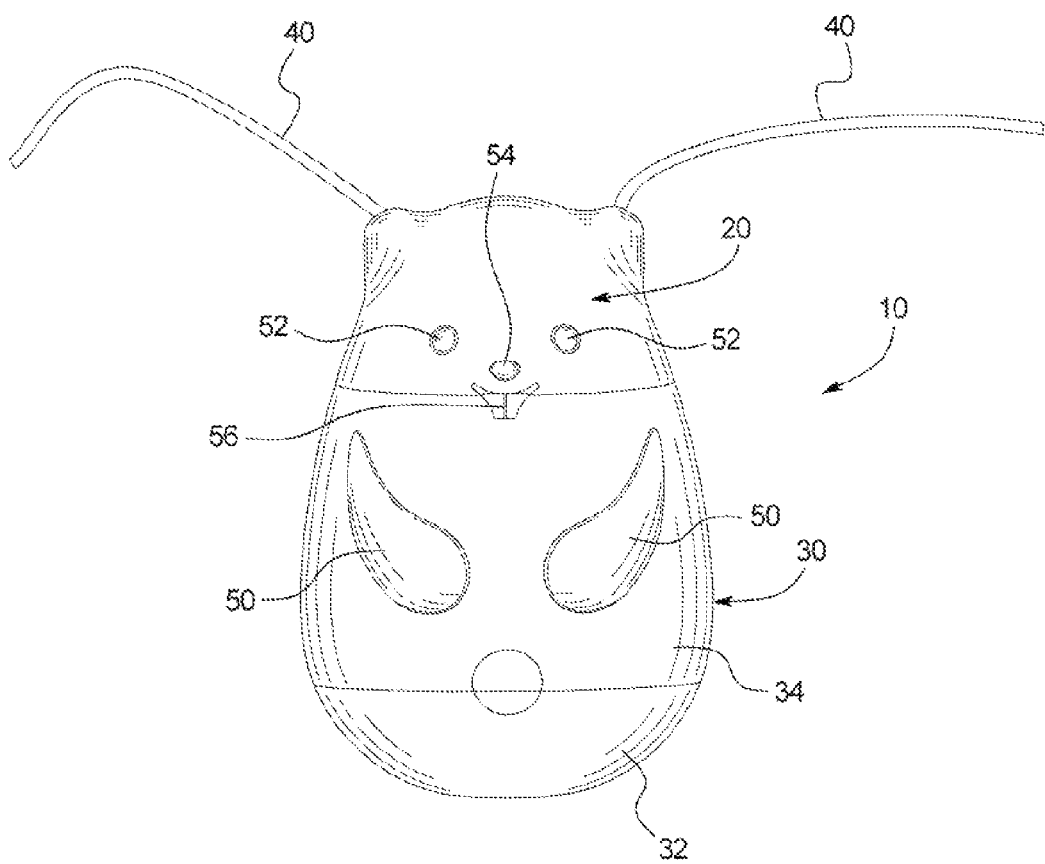
FIG. 1 shows an animal play toy having one or more ropes attached thereto in an embodiment of the invention.
Figure 2:
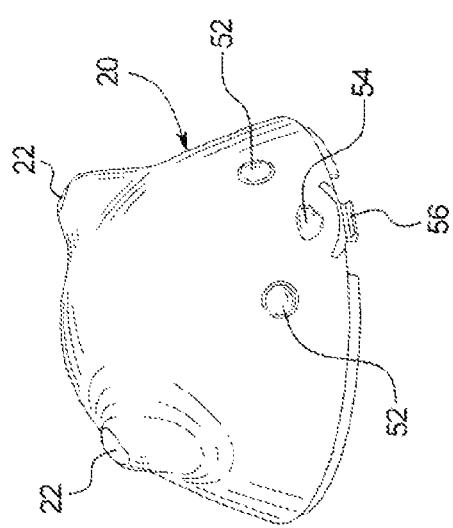
FIG. 2 shows a top portion of an animal play toy in an embodiment of the invention.
Figure 3:
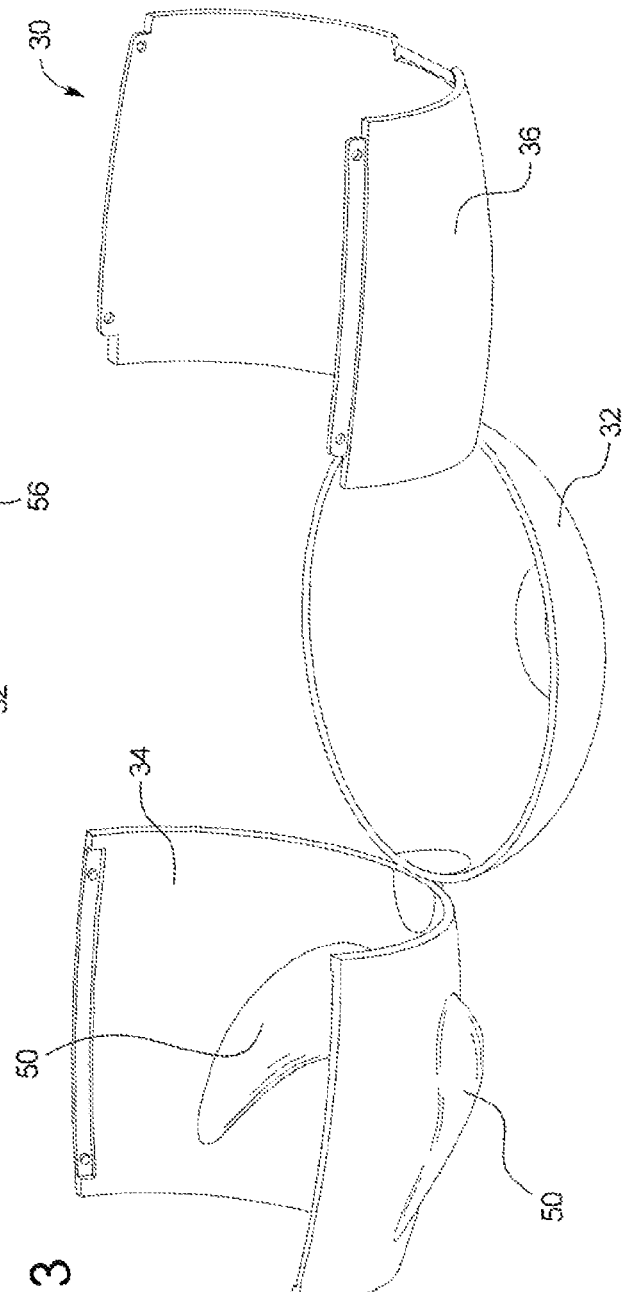
FIG. 3 shows a weighted bottom portion of an animal play toy in an embodiment of the invention.

The term "animal" means any animal that could benefit from an animal play toy. The animal can include a human, avian, bovine, canine, equine, feline, hicrine, lupine, murine, ovine, or porcine animal. The animal can also be any suitable pet or companion animal.

The term "companion animal" means a dog or a cat.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual components physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

The term "health and/or wellness of an animal" means the complete physical, mental, and social well being of the animal, not merely the absence of disease or infirmity.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a compound" or "a method" includes a plurality of such "compounds" or "methods." Similarly the words "comprise", "comprises", and "comprising" are to be interpreted inclusively rather than exclusively. Likewise the terms "include", "including" and "or" should all be construed to be inclusive, unless such a construction is clearly prohibited from the contexts.

The terms "comprising" or "including" are intended to include embodiments encompassed by the terms "consisting essentially of" and "consisting of". Similarly, the term "consisting essentially of" is intended to include embodiments encompassed by the term "consisting of".

All percentages expressed herein are by weight of the total weight of a composition unless expressed otherwise. For example, an ingredient in an amount of 25% by weight means that the ingredient is 25% of the total weight of a composition. Thus, if the total weight of the composition is 100 grams, the actual amount of the ingredient corresponding to 25% by weight would be 25 grams.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect shown in FIGS. 1-4, the invention provides an animal play toy 10 for engaging an animal in play before and during consumption of a treat attached thereto. Animal play toy 10 includes a top portion 20 defining at least one hole 22 therethrough and a weighted bottom portion 30. One or more ropes 40 can be attached to top portion 20 through hole 22. Weighted bottom portion 30 can include a front panel 34 and a back panel 36 hingedly attached to a weighted base 32. Weighted base 32 can include any suitable amount of a weighted material at its bottom so that animal play toy 10 assumes an upright position (e.g., standing) when stationary.

The values or ratios of height and weight of components of animal play toy 10 can prevent tipping over of animal play toy 10 and can return animal play toy 10 to the upright position after tilting. For example, the weighted bottom portion 30 can have a weight that is 52-90%, preferably 62-82%, and more preferably 72-82% of the total weight of animal play toy 10. The skilled artisan will appreciate that the dimensions of top portion 20 and weighted bottom portion 30 of animal play toy 10 may vary as desired or in accordance with manufacturing specifications or in accordance with the weight of weighted base 32.

The dimensions of top portion 20 and weighted bottom portion 30 of animal play toy 10 can be such that they have identical or substantially similar peripheral shapes so as to make animal play toy 10 appear as a cohesive unit as shown in FIG. 1. Front panel 34 and back panel 36 an be attached to each other using any suitable fastening mechanism such as snap-fitting, pressure-fitting, friction fitting, threaded fitting, etc. Weighted bottom portion 30 can be attached to top portion 20 using any suitable fastening mechanism such as snap-fitting, pressure-fitting, friction fitting, threaded fitting, etc.

As shown in FIGS. 1-4, animal play toy 10 can be in the shape of an animal in an embodiment. For example, top portion 20 can include features that resemble eyes 52, nose 54, and a mouth in the form at a latch 56. Holes 22 can be used to represent the ears of the animal. Weighted bottom portion 30 can include a pair of convex surfaces that represent arms 50 of the animal.

In an alternative embodiment, the animal play toy does not include any distinguishing features to represent an animal. For example, the animal play toy can include the top portion having one or more holes attached to a weighted bottom portion, with neither the top portion nor the weighted bottom portion having any ornamental features. The animal play toy in any embodiments described herein can be hollow or solid in any suitable amounts therein.

The outer surface of animal play toy 10 can include any suitable textures or gripping portions on top portion 20 and/or weighted bottom portion 30. The texture or gripping portions may be, for example, a rough surface or dimple grips.

Animal play toy 10 can further include an indicia or instructions printed on a surface of top portion 20 and/or weighted bottom portion 30. The indicia may include, for example, colors, numbers, letters, logos, advertisements, branding information, nutritional information, product information, manufacturer information, etc. Animal play toy 10 can have any suitable color. Top portion 20 can have the same color or a different color than weighted bottom portion 30.

Animal play toy 10 can be made from any suitable materials such as polymers, plastics or other synthetic materials. For example, animal play toy 10 can be made from a polyethylene material such as linear low density polyethylene, polypropylene, polyethylene terephthalate, etc. Alternatively, animal play toy 10 may be manufactured from non-plastic materials including, but not limited to, cardboard, metal, styrofoam, etc. Top portion 20 can be made from the same material or a different material than weighted bottom portion 30.

As shown in FIG. 1, one or more ropes 40 of a consumable product or non-consumable product can be attached to top portion 20 through hole(s) 22. For example, one end of each rope 40 can be fed through opening 22 in top portion 20 such that ropes 40 protrude circumscribing top portion's 20 outer surface. Animal play toy 10 has a low center of gravity allowing it to wobble without easily tipping over. Playful and slow feeding is achieved when a pet pulls on ropes 22 while animal play toy 10 is wobbling.

Rope 40 of a consumable product can be made from a material such as meat-jerky, rawhide, gelatin, dough, gelatinized starch-based food compositions, or a combination thereof. Ropes of the consumable product can also include one or more edible ingredients such as grains, starches, meat meals, proteins, fibers, sugars, vitamins, minerals, aromas, colors, flavors, oils, humectants, preservatives, or a combination thereof. Ropes of different flavors and/or textures may be used with a single animal play toy. For example, when more than one opening is present, each opening (or hole) of the animal play toy may be loaded with a different flavor and/or textured rope.

Rope 40 can also be a non-consumable product that is not intended to be eaten by the animal. Ropes of the non-consumable product can be made from a material such as fibers, plastic, nylon, resin, cotton, paperboard, or combination thereof.

Rope 40 can be provided or sold as a single piece or as part of a bundle of a plurality of ropes. If in a bundle, the rope can be peeled off prior to being loaded onto the animal toy product. Rope 40 can have any suitable overall length and thickness. Preferably, the overall length of rope 40 ranges from about 5 to about 20 inches. More preferably, the overall length of rope 40 ranges from about 8 to about 15 inches. The thickness of rope 40 will depend on the size of hole 22 and/or the mechanism by which rope 40 is attached to and maintained within hole 22 of animal toy product 10.

In one example of loading animal play toy 10, latch 56 connecting top portion 20 to weighted bottom portion 30 is flipped up and a rope 40 is threaded through opening 22. Any suitable portion or of amount of rope 40 (e.g., quarter, half, three quarters) can remain within top portion 20 when closed while the other half of rope 40 hangs out as shown in FIG. 1. Top portion 20 can then be snapped back shut onto weighted bottom portion 30.

Rope 40 can remain in hole 22 of animal play toy 10 using any suitable fastening mechanism such as a pressure-fitting, a friction fitting, a clip, etc. In one embodiment, the thickness of rope 40 is slight larger than the diameter of hole 22. Rope 40 can then be pressed into hole 22 thereby providing a pressure-fitting. Alternatively, a clip (not shown) can be incorporated onto the inner or outer surface of animal play toy 10 that clips rope 40 causing rope 40 to remain attached to animal play toy 10. The fastening mechanism used can be configured to provide a tight grip or a loose grip on rope 40.

During use, the animal (e.g., a cat) will pull on one or more of ropes 40. This action will tilt animal play toy 10 without tipping it over. If the animal chews a piece off rope 40, animal play toy 10 will return to the upright position. Playful activity may further be generated when the animal pulls rope 40 and releases it without chewing it off. Accordingly, animal play toy 10 provides a more engaging experience for the consumer and the pet.

Figure 4:
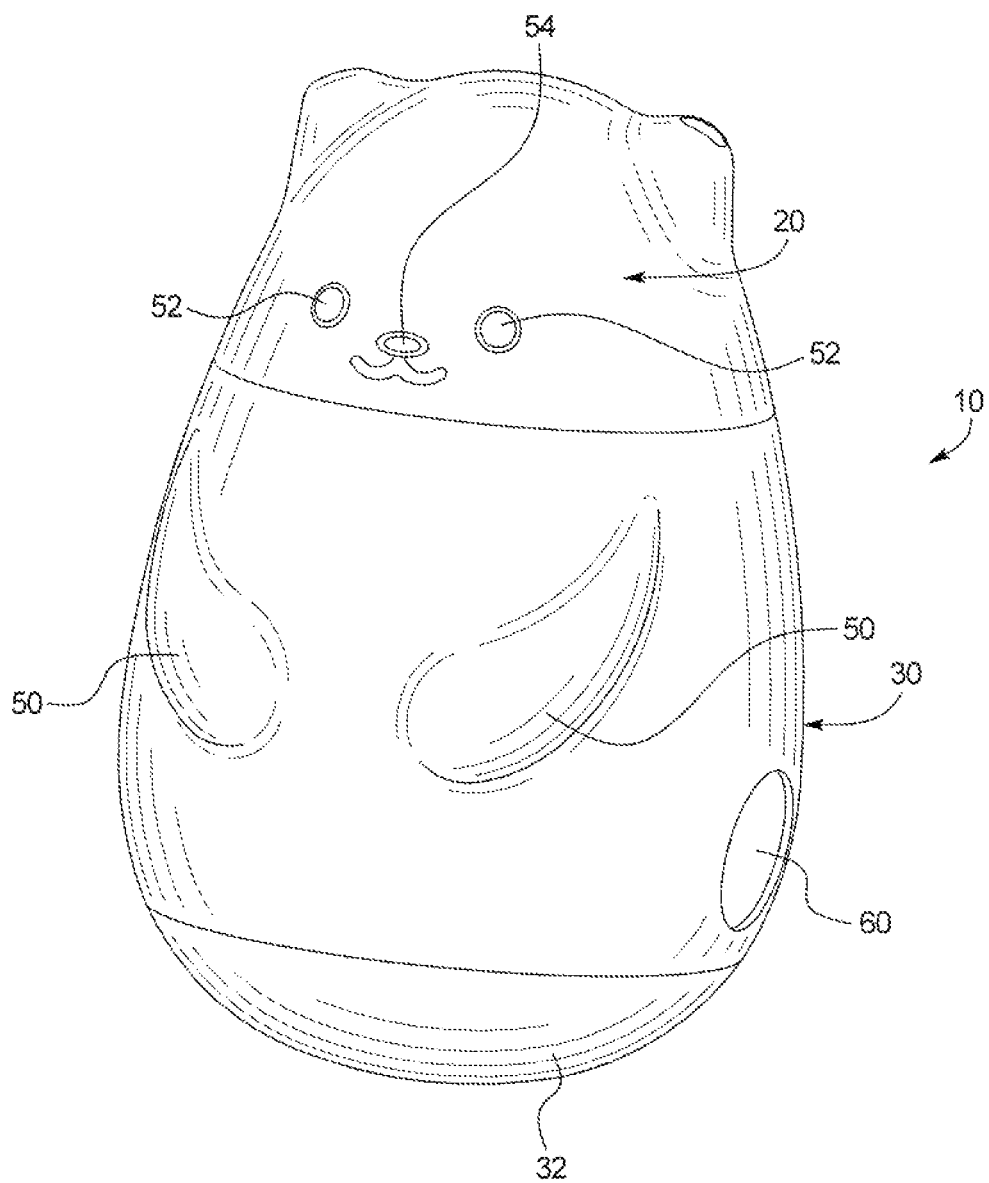
FIG. 4 shows an animal play toy having an opening therein in an embodiment of the invention.

In an embodiment generally illustrated in FIG. 4, animal play toy 10 has opening 60. Animal play toy 10 can contain items that exit animal play toy 10 through opening 60, for example when animal play toy 10 is tilted. The items exiting through opening 60 can encourage the pet to play with animal play toy 10. Opening 60 can be located in one or more of top portion 20 or weighted bottom portion 30. For example, opening 60 can be formed at least partially in one or more of top portion 20, front panel 34, back panel 36 or weighted base 32. Non-limiting examples of items that can be contained by animal play toy 10 and exit through opening 60 are snacks or treats, such as pellets, kibbles and the like. However, items contained by animal play toy 10 that exit through opening 60 are not limited to a specific embodiment, and these items can be any items that provide a more engaging experience for the consumer and the pet.

The items contained by animal play toy 10 that exit through opening 60 can be replaced, for example after these items have been dispensed by animal play toy 10. For example, latch 56 connecting top portion 20 to weighted bottom portion 30 can be flipped up and new items placed within animal play toy 10. Top portion 20 can then be snapped back shut onto weighted bottom portion 30.

In another aspect, the animal play toy is in the form a single unitary piece. For example, the animal play toy is a single body having a weighed bottom and one or more holes at or near a middle or upper portion of the single body. The holes are constructed and arranged to receive one or more of the ropes in a manner as discussed above. The ropes can be inserted into the one or more holes and locked therein in any suitable manner. As a result, the single unitary animal play toy can function in the same manner as animal play toy 10 made of multiple pieces.

In an alternative aspect, the invention provides a method for promoting the health or wellness of an animal. The method comprises providing to an animal an animal play toy having a top portion defining at least one hole therethrough, a weighted bottom portion, and a rope of at least one of a consumable product or a non-consumable product attached to the top portion through the hole. Playing with, chewing, and/or consuming the ropes of the animal play toys can help promote the health or wellness of the animal by providing activity and nutrition to the animal at the same time.

In an alternative aspect, the invention provides a kit comprising in a single package or in separate containers in a virtual package, as appropriate for a kit component, (A) an animal play toy according to any of the embodiment described herein, and (B) one or more of: (1) a rope of a consumable product; (2) a plurality of ropes of a consumable product packaged in a bundle; (3) a rope of a non-consumable product; (4) a plurality of ropes of a non-consumable product packaged in a bundle; (5) a description of the benefits of the animal play toy; (6) instructions for assembling and using the animal play toy with a rope of a consumable product; (7) instructions for assembling and using the animal play toy with a rope of a non-consumable product; or (8) instructions for how to promote the health or wellness of an animal using the animal play toy.

When the kit comprises a virtual package, the kit can be limited to instructions in a virtual environment in combination with one or more physical kit components. The kits may contain the kit components in any of various combinations and/or mixtures. For example, in one embodiment, the kit includes an animal play toy described herein and instructions for how to assemble and use the animal play toy. In another embodiment, the kit includes an animal play toy described herein and one or more ropes of a consumable product.

In an aspect, the invention provides a means for communicating information about or instructions for an animal play toy according to any of the embodiments described herein for one or more of: (1) assembling and using the animal play toy with a rope of a consumable product; (2) assembling and using the animal play toy with a rope of a non-consumable product; (3) describing the benefits of the animal play toy; (4) describing the benefits of the rope of the consumable or non-consumable product; or (5) promoting the health or wellness of an animal with the animal play toy.

The communication means can be a document, digital storage media, optical storage media, audio presentation, or visual display containing the information or instructions. More specifically, the means can be a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, or any combination thereof.

In another aspect, the invention provides a package comprising indicia describing an animal play toy according to any of the embodiments described herein. The indicia can be in the form of words, symbols, pictures, photographs, figures, or combinations thereof to show details or examples of the animal play toy described herein. The package can further contain the animal play toy. Alternatively or in addition to, the package can contain one or more ropes of a consumable product and/or one or more ropes of a non-consumable product (e.g., as bundles) that are sized to be inserted into the holes of the animal play toy.

In an alternative aspect, the invention provides a multi-pack package comprising 1) a plurality of containers arranged in an array, each of the plurality of containers comprising an animal play toy described herein, at least one or a plurality of the ropes of the consumable product packaged in a bundle, or at least one or a plurality of the ropes of the non-consumable product packaged in a bundle, and 2) one or more devices for retaining the containers in the array. In various embodiments, the devices are boxes made from paper, plastic, polymers, or a combination thereof. In others, the devices are systems of connected plastic rings affixed to each of the containers. In still others, the devices are wrappings of plastic of similar materials, e.g., twelve cans stacked in an array and wrapped in plastic. In some embodiments, the multi-pack packages have one or more handles affixed to the multi-pack packages to facilitate handling and transporting the multi-pack packages.

In other embodiments, the devices further comprise one or more windows that permit the package contents to be viewed without opening the multi-pack package. In some embodiments, the windows are a transparent portion of the devices. In others, the windows are missing portions of the devices that permit the containers to be viewed without opening the multi-pack package.

In preferred embodiments, the multi-pack packages further comprise one or more indicia describing the contents of the containers in the packages. The indicia can be in the form of labels, printing on the packages, stickers, and the like and include words, symbols, pictures, photographs, figures, or combinations thereof to provide detail or examples of the animal play toy comprising a top portion defining at least one hole therethrough and a weighted bottom portion described herein. In a preferred embodiment, a label is affixed to the multi-pack packages containing a word or words, picture, design, acronym, slogan, phrase, or other device, or combination thereof, that indicates that the contents of the package contain an animal play toy comprising a top portion defining at least one hole therethrough and a weighted bottom portion described herein.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. An animal play toy comprising:
   a top portion defining at least two holes therethrough, the two holes having the same orientation opposite each other on the top of the top portion; and
   a weighted bottom portion attached to the top portion, the weighted bottom having an opening for dispensing of an item contained in the animal play toy.

2. The animal play toy of claim 1 including at least one rope of a consumable product threaded through each hole of the top portion.

3. The animal play toy of claim 2 wherein the rope of the consumable product is made of a material selected from the group consisting of meat-jerky, rawhide, gelatin, dough, gelatinized starch-based food compositions, and combinations thereof.

4. The animal play toy of claim 2 wherein the rope of the consumable product includes one or more edible ingredients selected from the group consisting of grains, starches, meat meals, proteins, fibers, sugars, vitamins, minerals, aromas, colors, flavors, oils, humectants, preservatives, and combinations thereof.

5. The animal play toy of claim 2 wherein a plurality of the ropes are packaged in bundle.

6. The animal play toy of claim 1 including at least one rope of a non-consumable product threaded through each hole of the top portion.

7. The animal play toy of claim 6 wherein the rope of the non-consumable product is made from a material selected from the group consisting of fibers, plastic, nylon, resin, cotton, paperboard, and combinations thereof.

8. The animal play toy of claim 6 wherein a plurality of the ropes are packaged in bundle.

9. The animal play toy of claim 1 in the shape of an animal.

10. The animal play toy of claim 1 in the form a single unitary piece.

11. A method for promoting the health or wellness of an animal comprising providing to an animal an animal play toy having a top portion defining at least two holes therethrough, the two holes having the same orientation opposite each other on the top of the top portion; a weighted bottom portion, the weighted bottom having an opening for dispensing of an item contained in the animal play toy; and a rope of at least one of a consumable product or a non-consumable product attached to the top portion through the hole.

12. The method of claim 11 wherein the rope of the consumable product is made of a material selected from the group consisting of meat-jerky, rawhide, gelatin, dough, gelatinized starch-based food compositions, and combinations thereof.

13. The method of claim 11 wherein the rope of the non-consumable product is made from a material selected from the group consisting of fibers, plastic, nylon, resin, cotton, paperboard, and combinations thereof.

* * * * *